United States Patent [19]
Tang

[11] 3,955,551
[45] May 11, 1976

[54] DIAMOND WHEEL MOUNTING ASSEMBLY
[75] Inventor: Arthur Y. C. Tang, Framingham, Mass.
[73] Assignee: General Diode Corporation, Framingham, Mass.
[22] Filed: Aug. 27, 1974
[21] Appl. No.: 500,857

[52] U.S. Cl. .................................................. 125/15
[51] Int. Cl.² ......................................... B28D 1/04
[58] Field of Search............ 125/15; 51/73 R, 206 R

[56] References Cited
UNITED STATES PATENTS

| | | | |
|---|---|---|---|
| 2,713,339 | 7/1955 | Sayers................................ | 125/15 |
| 3,254,641 | 6/1966 | Blaine.................................. | 125/15 |
| 3,324,539 | 6/1967 | Cleland............................ | 125/15 X |
| 3,329,138 | 7/1967 | Lupardo ............................ | 125/15 |

Primary Examiner—Harold D. Whitehead
Attorney, Agent, or Firm—John E. Toupal

[57] ABSTRACT

Disclosed herein is a unique carrier for mounting on a rotatable spindle an annular saw blade possessing a cutting edge on its inner periphery and a plurality of annularly distributed mounting holes. The carrier includes a chuck for mounting on the spindle and for clamping the blade to the chuck. Formed in the annular clamp are a plurality of screw holes disposed for alignment with others of the mounting holes. The screw holes are threaded to receive mounting screws and have minimum diameters smaller than those of the mounting holes with which they are aligned while the alignment holes have minimum diameters equal to those of the mounting holes with which they are aligned. Centering of the blade on the annular clamp is accomplished by merely passing through the mated alignment and mounting holes an alignment tool having a diameter equal thereto. Subsequently, the clamping of the blade is achieved by inserting and tightening mounting screws in the mated screw and mounting holes.

9 Claims, 4 Drawing Figures

DIAMOND WHEEL MOUNTING ASSEMBLY

BACKGROUND OF THE INVENTION

The present invention relates generally to a cutting device and, more particularly, to a cutting device utilizing an annular blade with an internal cutting edge used primarily for slicing thin wafers from ceramic materials.

Internal diameter cutting devices are widely employed for slicing thin crystal wafers used in the production of semiconductors. The annular cutting blades (ID discs) or discs utilized with such machines have circular cutting edges on their internal peripheries, usually in the form of a coating having diamond dust suspended therein. These cutting discs generally are clamped between a pair of annular clamping rings that are then secured to a rotatable spindle. To facilitate this operation the blades normally are provided with a plurality of annularly distributed mounting holes that accommodate mounting screws.

The operation of centering and tensioning an ID disc requires a considerable degree of care and skill, and as a cutting machine may require several replacements of worn-out wheels in the course of a day, the time lost in properly centering and tensioning the wheels within the holding ring and mounting the same on the spindle is very considerable. Thus, in one method of preparing a tensioned ID disc assembly, there are employed two steel rings, one of which has a convex and the other a concave surface, between which the wheel is clamped in such manner that a radial tension is created therein. To effect the assembly, the convex ring is first placed upon a centering fixture which includes an annular base shoulder and a centrally disposed and axially movable centering sleeve which consists essentially of a cone-shaped member and a knurled knob for rotating it counter-clockwise or clockwise to raise or lower the cone member. The ring with the convex surface is first placed over the base shoulder and the cutting wheel is then placed in position over the centering sleeve with its peripheral region over the convex area of the ring. The centering sleeve knob is then turned counter-clockwise until the sleeve touches the cutting edge of the wheel. A hold-down plate is now placed over the sleeve and upon the wheel, and is centered as closely as possible. The centering sleeve is then turned counter-clockwise until the sleeve meets resistance, and tends to turn the hold-down plate and cutting wheel, the wheel being now in centered position. The outside or concave ring is now placed upon the convex ring, while the hold-down plate is held by holddown clamps to lock the hold-down plate and cutting wheel in place.

The second ring is then rotated until screw holes therein are brought into registry with threaded holes in the convex ring. Clamping screws are then inserted into the screw holes and tightened to apply tension to the cutting wheel as the two rings are forced together. The clamps are then released and the hold-down plate is removed. The assembly is now rotated off the centering sleeve and base shoulder, and is then mounted on the spindle.

In another known method of centering and tensioning an ID disc between a pair of clamping steel rings there is again employed a centering device which includes a cone-shaped member, and also three centering chuck jaws. The centering device includes a ring provided with dowel pins by means of which a first clamping ring with flat surfaces is positioned on the centering device. The clamping face of the ring is provided with knurls and a V-groove designed to grip the peripheral region of the cutting wheel.

After placing the ID disc upon the first ring, the chuck jaws are expanded against the inside periphery of the wheel and thereby center it. The wheel and chuck are then rotated to effect matching of cap screwholes in the first ring and wheel. A second or lock ring is then positioned over the wheel, such ring being provided with a V-rib which mates with the V-groove in the first ring. Cap screws are then applied to bind the two rings with the wheel there between for providing an initial tensioning.

The second ring is internally threaded, and there is then screwed into such ring an externally threaded tensioning ring, which is turned until it bears against the surface of the cutting wheel. Further rotation of the tensioning ring, as with a spanner wrench, develops radial tension in the cutting wheel. The assembly is then mounted on the cutting machine.

It will be evident from the foregoing description that the accurate centering and tensioning of ID discs on a machine is a delicate and time-consuming operation. The object of this invention, therefore, is to provide a cutting machine on which annular ID discs can be accurately mounted in less time than has been required previously.

SUMMARY OF THE PREFERRED EMBODIMENT

The present invention provides a unique carrier for mounting on a rotatable spindle an annular saw blade possessing a cutting edge on its inner periphery and a plurality of annularly distributed mounting holes. The carrier includes a chuck for mounting on the spindle and for clamping the blade to the chuck. Formed in the annular clamp are a plurality of screw holes disposed for alignment with some of the mounting holes in the blade and a plurality of alignment holes disposed for alignment with others of the mounting holes. The screw-holes are threaded to receive mounting screws and have minimum diameters smaller than those of the mounting holes with which they are aligned while the alignment holes have minimum diameters equal to those of the mounting holes with which they are aligned. Centering of the blade on the annular clamp is accomplished by merely passing through the mated alignment and mounting holes an alignment tool having a diameter equal thereto. Subsequently, the clamping of the blade is achieved by inserting and tightening mounting screws in the mated screw and mounting holes. In the embodiment described, the annular clamp includes a pair of clamp rings between which the blade is clamped and each provided with three alignment holes disposed in a circular array and spaced approximately 120° apart.

A preferred embodiment of the invention employs a chuck formed as a hollow cylindrical drum with an open end defined by a peripheral rim and having a circumferential flange extending around its outer surface and longitudinally spaced from the rim. The internal diameter of the annular clamp permits it to pass over the chuck's peripheral rim which engages an intermediate portion of the annular cutting blade and thereby applies tension thereto. The clamp is secured to the drum by screws that extend into the circumferential flange. Preferably, both the clamp and the drum are formed of aluminum and the mounting screws engage sleeves press fitted into the circumferential flange and having heads that engage the outer surface of the drum so as to prevent their rotation. Adjustment of the tension on the blade is facilitated in this arrangement by the use of U-shaped spacers that can be selectively inserted over the mounting screws between the annular clamp and the circumferential flange without complete dismantling of the system.

One feature of the embodiment described above is the provision in the chuck of drain holes that open into an internal recess disposed between the peripheral rim and the circumferential flange. The annular recess traps residue produced during cutting operations and insures its removal through the drain openings thereby preventing the development of an imbalance during use of the machine. An additional plurality of drain holes are provided adjacent a closed inner wall surface of the drum opposite the peripheral rim. The additional drain holes insure removal of any residue not trapped by the annular recess.

DESCRIPTION OF THE DRAWINGS

These and other objects and features of the present invention will become more apparent upon a perusal of the following specification taken in conjunction with the accompanying drawings wherein.

DESCRIPTION OF THE PREFERRED EMBODIMENT

Figure 1:
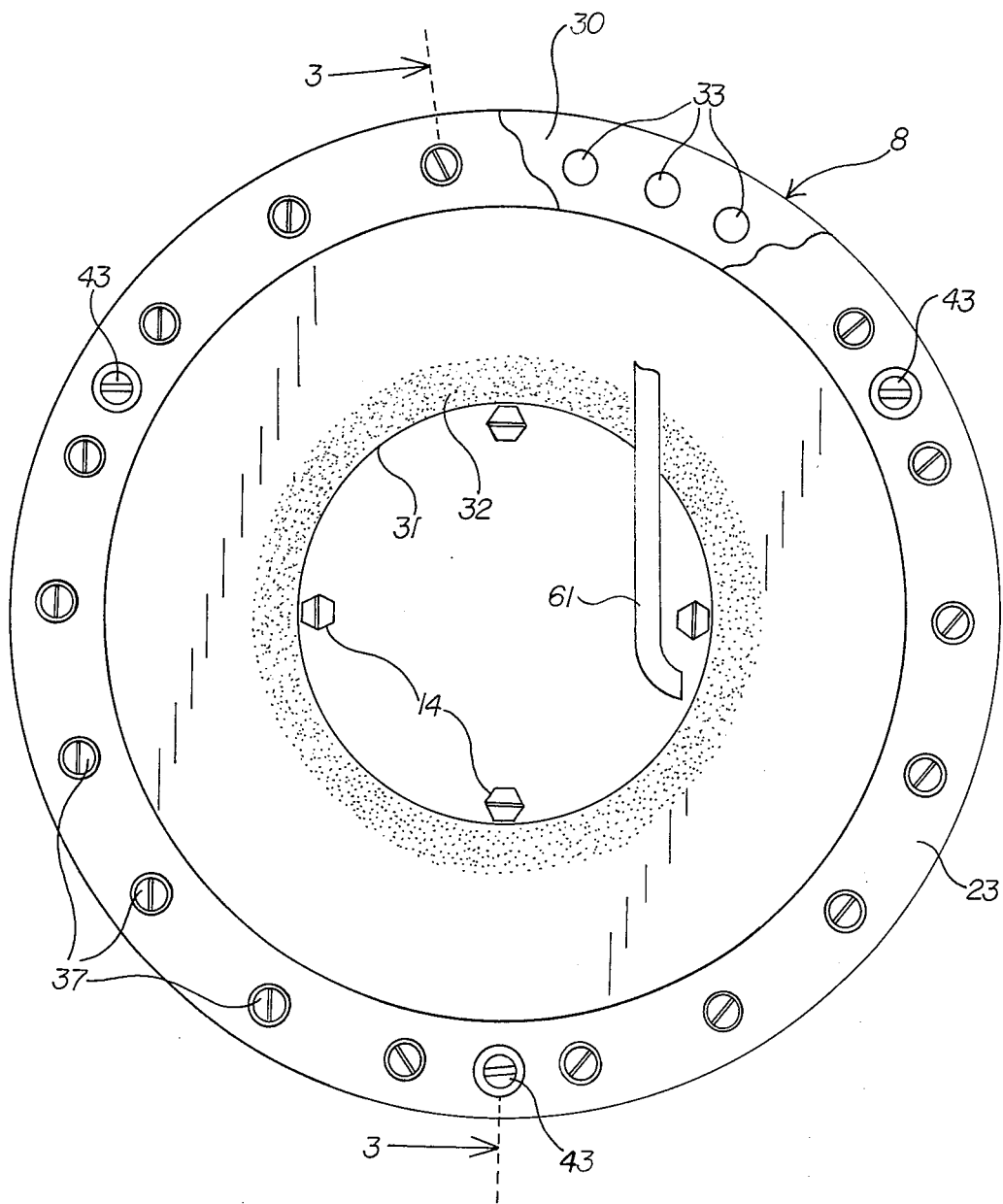
FIG. 1 is a front view of a cutting device according to the invention.

Referring now to the Figs., an annular saw blade 8, described in greater detail hereinafter, is supported by a carrier system 9 on a rotatable spindle 10. The carrier system 9 includes a chuck in the form of a hollow cylindrical drum 11 having a closed end 12 and an opposite open end defined by a peripheral rim 13. The drum 11 is attached by screws 14 to the rotatable spindle 10 driven by a suitable drive mechanism (not shown). Extending around the outer surface of the drum 11 is a circumferential flange 16 longitudinally spaced from the peripheral rim 13. Extending around the inner surface of the drum 11 between the flange 16 and the rim 13 is a circumferential recess 17 defined by annular shoulder 17a and the blade into which open drain holes 18. Additional drain holes 19 are located at the opposite end of the drum 11 adjacent the closed end wall 12.

Also included in the carrier system 9 is an annular clamp mechanism 21 that mounts the blade 8 onto the drum 11. The clamp mechanism 21 comprises an inner clamp ring 22 and an outer clamp ring 23 that straddle and clamp an outer marginal portion of the blade 8. To enhance the clamping forces applied to the blade 8 by the clamp mechanism 21, the inner ring is provided with a knurled concave surface 24 and the outer ring 23 is provided with a mating knurled convex surface 25. The mating knurled surfaces 24 and 25 prevent buckling of the blade 8 during cutting operations.

The saw blade 8 comprises a thin annullus formed of a material such as stainless steel and having an inner peripheral edge 31 that functions as a cutting edge. Carried by the annular blade along an inner peripheral margin are small particles 32 of a cutting agent such as diamond dust which can be pressed into the metal blade or cemented thereto in a manner described for example in U.S. Pat. Nos. 3,491,742 and 3,626,921. The blade 8 possesses a plurality of uniformly space apart, mounting holes 33 annularly distributed along an outer margin that coincides with the clamp rings 22 and 23. Aligned with alternate ones of the mounting holes 33 are screw holes 35 and 36 located, respectively, in the inner and outer clamp rings 22 and 23. Preferably the clamp rings 22 and 23 are formed of a light metal such as aluminum and the internal threads of the screw holes 35 and 36 comprise press fitted stainless steel heli-coils. Engaging the screw holes 35 and 36 so as to clamp the blade 8 securely between the rings 22 and 23 are a plurality of externally threaded mounting screws 37.

Also formed in each of the clamp rings 22 and 23 are three alignment holes 41, 42 aligned with three others of the mounting holes 33 spaced 120° apart along the peripheral margin 30. The diameters of the smooth walled alignment holes 41 and 42 are exactly the same as those of the mounting holes 33 in the blade 8 and, thus, slightly larger than the minimum diameters of the threaded screw holes 35 and 36 for reasons described more fully below. Three alignment screws 43 extend through the alignment openings 41 and 42 and engage internally threaded sleeves 44 press fitted into openings in the circumferential flange 16. One end of each of the sleeves 44 terminates with a head portion 45 that engages the outer surface of the drum 11 so as to prevent rotation while the other end retains press fitted caps 46. Disposed between the sleeves 44 and the inner clamp ring 22 are a plurality of U-shaped spacer washers 47 that selectively establish the spacing between the circumferential flange 16 and the clamp mechanism 21 as described more fully below.

Figure 2:
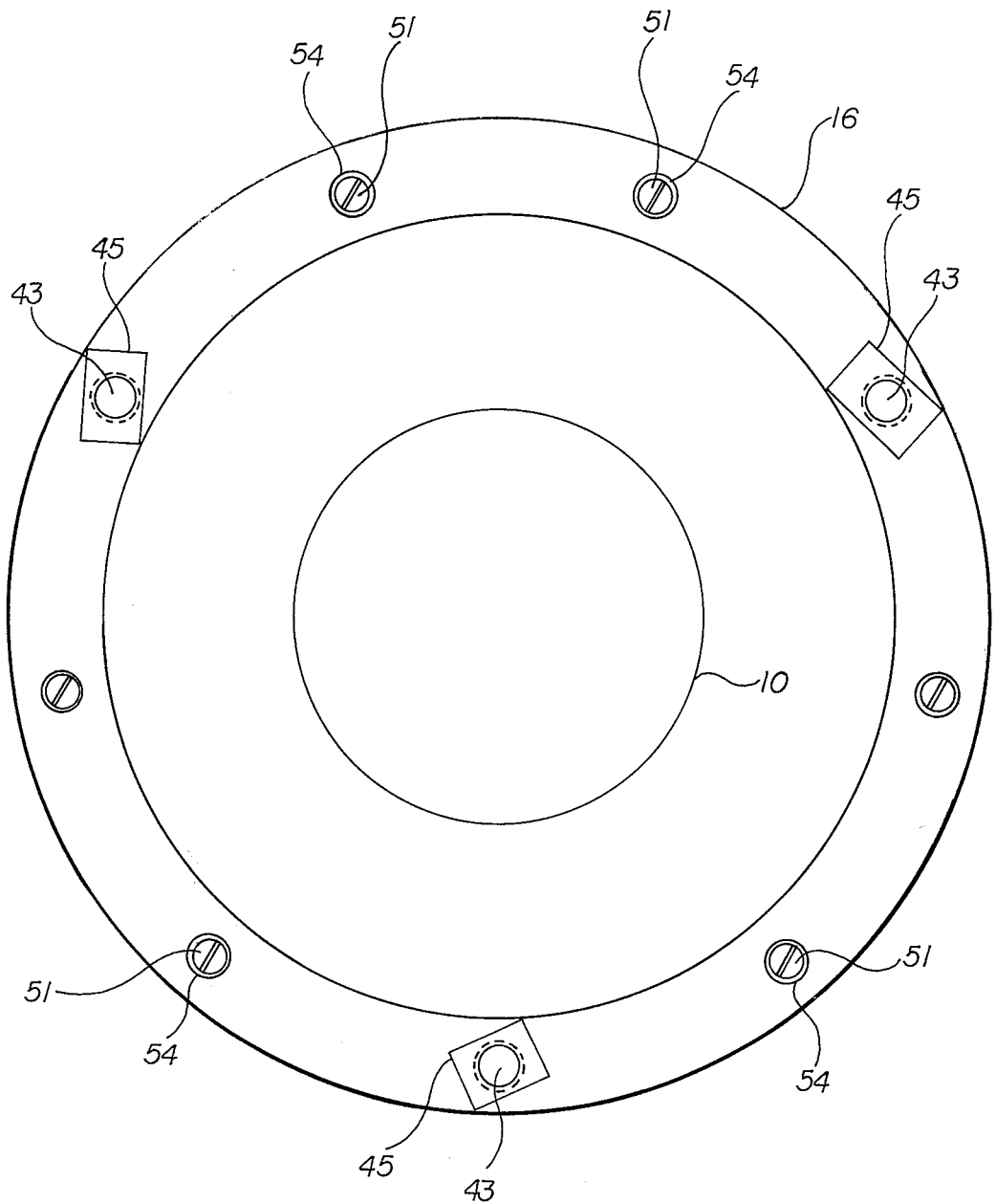
FIG. 2 is a rear view of the cutting device shown in FIG. 1.
Figure 4:
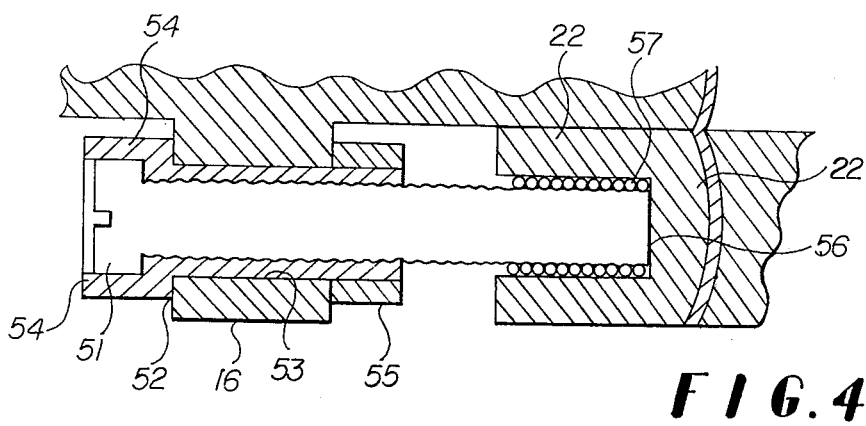
FIG. 4 is a detailed sectional view of one of the fittings used in the cutting device shown in FIGS. 1–3.

As shown in FIGS. 2 and 4, the clamp mechanism 21 is further secured to the flange 16 by two additional screws 51 between each pair of alignment screws 43. Retaining the screws 51 are internally threaded sleeves 52 press fitted into holes 53 through the circumferential flange 16. Each of the sleeves 52 possesses at one end a recessed head 54 that accommodates a head on a screw 51 and at its other end a press fitted cap 55. The ends of the screws 51 engage stainless steel heli-coils 56 pressed into holes 57 in the inner clamp ring 22.

To assemble the cutting device illustrated in FIGS. 1–4, the drum 11 is first secured to the spindle 10 with the screws 14. Next, a blade 8 is positioned between the clamp rings 22 and 23 so as to produce alignment between the alignment holes 41 and 42 and three of the mounting holes 33. Centering of the blade 8 is insured by passing through each pair of holes 41 and 42 a smooth walled centering tool (not shown) with a diameter equal to those of the holes 41 and 42. Since the mounting holes 33 are also of that diameter, the centering tool moves the blade 8 into an exactly centered position with respect to the clamp mechanism 21. The blade 8 is then tightly clamped between the clamp rings 22 and 23 by turning the screws 37 into the stainless steel heli-coils 35. Subsequent buckling of the blade 8 is prevented by the knurled surfaces 24 and 25 on the clamp rings 22 and 23, respectively.

Figure 3:
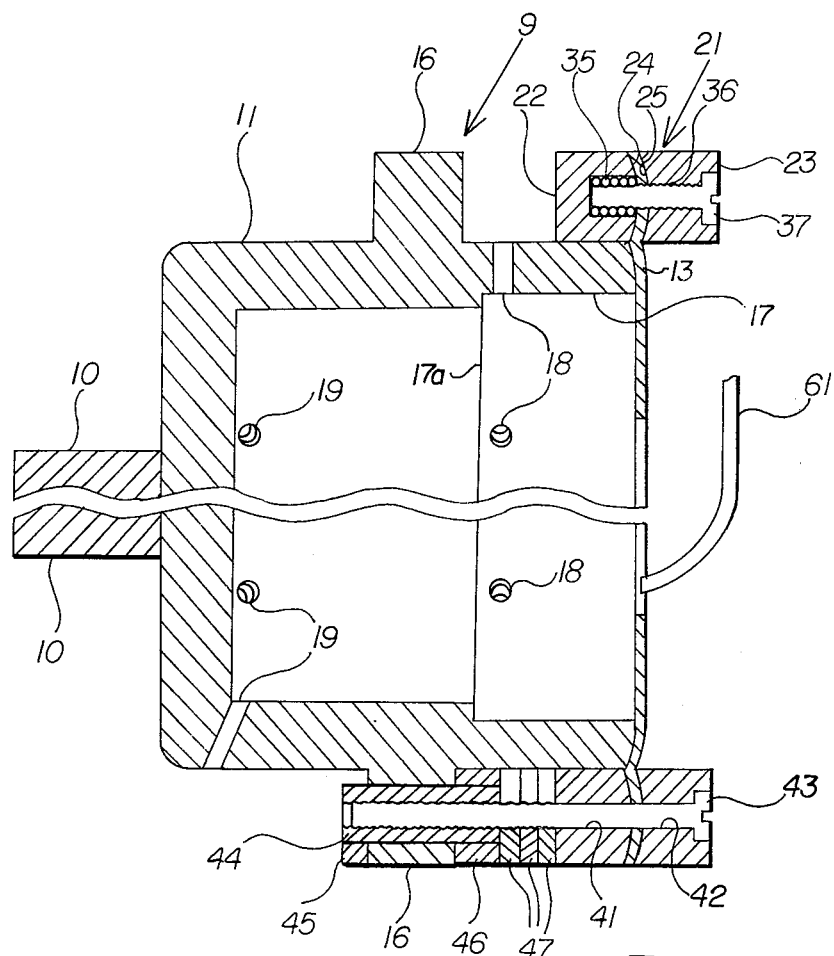
FIG. 3 is a cross-sectional view of the cutting device taken along lines 3—3 of FIG. 1.

After assembly, the clamp mechanism 21 retaining the blade 8 is passed over the open end of the drum 11 until the peripheral rim 13 engages an intermediate portion of the blade 8 as shown in FIG. 3. This engagement establishes the required tension required of the blade 8 during cutting operations Next, the mechanism 21 is secured in place by turning the screws 43 into the sleeves 44 in the flange 16. The desired degree of tension on the blade 8 is established by appropriate selection of the U-shaped spacers 47. Rotation of the sleeves 44 within the accommodating holes in the flange 16 is prevented by engagement of the head portions 45 with the outer surface of the drum 11. Finally, the additional screws 51 are turned through the sleeves 52 into the heli-coils 57 in the inner clamp ring 22 to further secure the clamp mechanism 21 in place. It will be obvious that the tension applied to the blade 8 can be selectively altered at any time during use by merely loosening the screws 43 and 51 and substituting appropriate spacers 47 without any requirement for removing the clamp mechanism completely from the drum 11.

During cutting operations a liquid coolant is discharged onto the workpiece from a supply tube 61 connected to a suitable liquid source (not shown). Residue produced by the cutting operation is washed by that liquid into the drum 11 and accumulates in the recess 17 thereby preventing it from migrating further into the interior of the drum 11. The accumulated residue is removed from the recess 17 by the liquid passing out of the drum 11 through the drain holes 18. In this way accumulation of residue that could produce a rotational imbalance for the device is prevented. In the event, however, that any limited quantity of residue does move internally of the recess 17, such residue also will be removed through the drain openings 19 disposed adjacent the inner wall 12 of the drum 11.

Obviously, many modifications and variations of the present invention are possible in light of the above teachings. It is to be understood, therefore, that the invention can be practiced otherwise than as specifically described.

What is claimed is:

1. A cutting device comprising:
a rotatable spindle adapted to be driven by a drive means;
an annular saw blade possessing on its inner periphery a cutting edge, said blade further possessing a plurality of annularly distributed mounting holes;
carrier means supporting said blade on said spindle for rotation therewith and comprising chuck means mounted on said spindle; said chuck means being a hollow cylindrical drum having an open end defined by a peripheral rim and a circumferential flange extending around the outer surface of said drum and longitudinally spaced from said rim, the internal surface of said drum having an annular shoulder defining an annular recess for trapping residue produced during cutting operations, said recess being located between said flange and said rim, said drum further defining a plurality of openings for drawing from said drum the residue produced during cutting operations, said openings extending through a portion of said drum between said flange and said rim and opening into said recess;
annular clamp means clamping said blade to said chuck means and possessing a plurality of screw holes disposed for alignment with some of said mounting holes and a plurality of alignment holes disposed for alignment with others of said mounting holes, said screw holes being threaded and having minimum diameters smaller than those of said mounting holes with which they are aligned and said alignment holes having minimum diameters equal to those of the mounting holes with which they are aligned, and a plurality of screws extending through said aligned mounting and screw holes, said annular clamp means having an internal diameter that permits said clamp means to pass over said peripheral rim, said annular blade having an internal diameter smaller than the internal diameter of said annular clamp means so as to comprise an inner portion that projects inwardly thereof and is engaged by said peripheral rim, and said screws extending through said alignment holes engage said circumferential flange; and
adjustment means comprising a plurality of U-shaped washers disposed between said flange and said clamp means and received by said screws extending through said alignment holes.

2. A cutting device according to claim 1 wherein said alignment holes comprise three alignment holes disposed in a circular array and spaced approximately 120° apart.

3. A cutting device according to claim 1 wherein said annular clamp means comprises a pair of clamp rings each possessing said screw and alignment holes, said blade being clamped between said clamp rings by said screws.

4. A cutting device according to claim 3 wherein said clamp rings are secured to said chuck means by said screws extending through said alignment holes.

5. A cutting device according to claim 4 wherein one of said clamp rings possesses an annular concave surface and the other of said clamp rings possesses an annular convex surface that engages said concave surface.

6. A cutting device according to claim 5 wherein said concave and convex surfaces are knurled.

7. A cutting device according to claim 1 wherein said drum defines an additional plurality of drain holes located at an end thereof opposite said rim.

8. A cutting device according to claim 1 wherein said flange defines a plurality of circumferentially distributed securement holes, and including an additional plurality of screws extending through said securement holes and engaging said clamp means.

9. A cutting device according to claim 8 including a plurality of internally threaded sleeves retained in said holes in said flange and engaged by said screws extending therethrough, said sleeves having heads that engage the outer surface of said drum to prevent rotation of said studs.

* * * * *